United States Patent
Ehrsam et al.

(10) Patent No.: US 7,345,954 B2
(45) Date of Patent: Mar. 18, 2008

(54) BRACELET WITH CLIP COMPRISING ELECTRICAL CONNECTION MEANS

(75) Inventors: Nicolas Ehrsam, Evilard (CH); Jacques Müller, Reconvilier (CH); Clément Meyrat, Le Landeron (CH)

(73) Assignee: The Swatch Group Management Services AG, Biel (CH)

( * ) Notice: Subject to any disclaimer, the term of this patent is extended or adjusted under 35 U.S.C. 154(b) by 68 days.

(21) Appl. No.: 10/561,808

(22) PCT Filed: Jun. 22, 2004

(86) PCT No.: PCT/EP2004/006735

§ 371 (c)(1),
(2), (4) Date: Dec. 21, 2005

(87) PCT Pub. No.: WO2004/114030

PCT Pub. Date: Dec. 29, 2004

(65) Prior Publication Data

US 2006/0140055 A1    Jun. 29, 2006

(30) Foreign Application Priority Data

Jun. 25, 2003   (EP)   .................................. 03014249

(51) Int. Cl.
G04B 47/00    (2006.01)
(52) U.S. Cl. ........................................ 368/10; 368/281
(58) Field of Classification Search ................ 368/281, 368/10
See application file for complete search history.

(56) References Cited

U.S. PATENT DOCUMENTS 3,670,491 A * 6/1972 Weschler .................... 368/204
4,323,996 A    4/1982 Ganter
4,427,303 A * 1/1984 Matthias ..................... 368/282
4,885,728 A * 12/1989 Gosselin ..................... 368/10
5,189,431 A * 2/1993 Marinelli .................... 343/718
6,767,218 B2 * 7/2004 Marmaropoulos ........... 439/37
6,854,978 B2 * 2/2005 Noirjean ..................... 439/37
6,863,539 B2 * 3/2005 Marmaropoulos ........... 439/37
6,874,931 B2 * 4/2005 Noirjean et al. ............ 368/282

(Continued)

FOREIGN PATENT DOCUMENTS

| CH | 661 172 A3 | 7/1987 |
| EP | 1 317 043 A1 | 6/2003 |
| FR | 2 641 092 A1 | 6/1990 |
| FR | 2 854 711 A1 | 11/2004 |
| WO | 97 02513 A1 | 1/1997 |
| WO | 2004/100059 A2 | 11/2004 |

OTHER PUBLICATIONS

Patent Abstracts of Japan, vol. 2003, No. 09, Sep. 3, 2003 & JP 2003 140771 (Citizen Watch Co., Ltd.), May 16, 2003.

Primary Examiner—Gary Paumen
(74) Attorney, Agent, or Firm—Sughrue Mion, PLLC

(57) ABSTRACT

The wristband with a clasp (1) includes electrical connection means (2) for connection to at least one electric or electronic component (23). These electrical connection means include an electric connector (2) arranged in one part of the clasp connected to one end of a wristband strand. The connector is of the universal serial bus type so as to be able to be connected, when the clasp is in the open position, to a connector of complementary shape of an electric apparatus, such as a computer station for carrying out energy and/or data transmission with the electric or electronic component. The connector is protected by a fastening piece (6) and bellows (5) when the clasp is in the closed position.

16 Claims, 4 Drawing Sheets

U.S. PATENT DOCUMENTS

| | | |
|---|---|---|
| 7,019,702 B2 * | 3/2006 | Henriet et al. ............... 343/718 |
| 7,113,137 B2 * | 9/2006 | Bisig ........................... 343/718 |
| 2004/0081025 A1 | 4/2004 | Chen |
| 2004/0151071 A1 * | 8/2004 | Kocher ......................... 368/10 |
| 2006/0178055 A1 * | 8/2006 | Robin ......................... 439/660 |

* cited by examiner

BRACELET WITH CLIP COMPRISING ELECTRICAL CONNECTION MEANS

BACKGROUND OF THE INVENTION

The invention concerns a bracelet or wristband with a clasp comprising electrical connection means to be connected to at least one electric or electronic component. The wristband can advantageously be the wristband of a portable object, such as a watch. In this case, the electric or electronic component can be housed in a case of the portable object or in the wristband.

The invention also concerns a wristwatch including a clasp and at least one electric or electronic component electrically connected to electrical connection means.

"Electric or electronic components" means any electric or electronic element for performing certain functions without any limitations. This may, for example, be batteries or energy accumulators, and electronic or integrated circuits.

Two types of clasp are usually used for wristbands or wristwatches. It may be a clasp for a so-called open wristband or for a closed wristband.

The clasp for an open wristband conventionally includes a prong and a buckle secured using a stem at the free end of one of the strands of the wristband. The free end of the other strand is passed under the buckle then secured by the prong which penetrates one of the holes made in said other strand. A loop could be provided to secure the free end of the other strand.

The clasp for a closed wristband is conventionally of the unfolding buckle type. Generally, in its simplest form, the clasp with an unfolding buckle includes a base strip onto which at least one pivoting strip is capable of folding down. These strips are attached to each other by one of their ends by means of a hinge. Usually, fastening means, such as a catch device enable the strips to hook onto each other in the closed position.

Since the wristband or wristwatch are objects that are worn daily on the user's wrist, it has been proposed to fit them with various electric or electronic components other than time-keeper circuits for performing certain functions. They can include components such as accumulators or electronic circuits particularly for data transmission operations. Electrical connections can also be made between the various components carried by the wristband or integrated therein and those contained in the watchcase.

In order to charge an accumulator or transmit data between an electrical apparatus and at least one electronic circuit arranged in the watchcase, specific electrical connection means sometimes have to be provided through the watchcase. It is thus also possible, via this electrical connection, to electrically charge an accumulator of the watch if the electrical apparatus is a charger, or to transfer data between the electronic circuit of the watch and the electric apparatus.

However, these known connection means have no other function than providing an electric connection between the electric apparatus and the electronic component or components. The connection means made through the case or on one strand of the wristband are generally detrimental to the aesthetic appearance of the wristwatch or wristband. Moreover, the connection means theoretically have to be protected when they are not connected to the electric apparatus so as not to disturb the electronic component or components that have to perform certain functions.

In this regard, U.S. Pat. No. 4,323,996 can be cited, which discloses an electronic wristwatch including an electronic circuit in the case and electrical connection means connected to the electronic circuit. These electrical connection means are formed in particular by electric contact terminals, which are placed under the back cover of the watchcase. A connector cap of the connection means is secured under the case to connect the contact terminals. An electric cable is connected to the connector cap and ends in a connector in order to activate an electric connection with an electric apparatus.

One drawback of the wristwatch disclosed in U.S. Pat. No. 4,323,996 is that an additional protective element, such as the cap, has to be added to the back cover of the watchcase in order to electrically connect the electronic circuit via electric contact terminals of the back cover of the case to an electric apparatus. This additional cap increases the thickness of the watch unnecessarily, and is detrimental to the aesthetic appearance of the watch.

SUMMARY OF THE INVENTION

It is thus an object of the invention to provide a wristband or bracelet with a clasp which includes electrical connection means overcoming the drawbacks of the aforementioned prior art. The connection means are arranged on the wristband so to not to impair the aesthetic appearance of said wristband when the wristband is worn on a user's wrist.

The invention therefore concerns a wristband with a clasp, which includes the features recited in the appended claims.

One advantage of the wristband with a clasp according to the invention is that the electric connector is placed in a part of the clasp of a wristband to be worn on a user's wrist. Consequently, when the clasp is in the closed position, it can be protected from any mechanical damage or influence of the environment without also impairing the aesthetic appearance of said wristband.

The wristband clasp can have an unfolding buckle with a base on which two strips are hinged at each end of the base. The other end of each strip is hinged at one end of each strand of the wristband or at both ends of the same wristband strand. When the clasp is in the closed position, fastening means, such as a conventional catch device, block one part of each strip in a part of the base. A button, which is for example arranged on the base, can be activated manually to release the strips in order to open the clasp. Clasp bellows can also be secured to one end of one wristband strand to close and protect the electric connector when the clasp is in the closed position.

The electric connector placed at one end of one of the wristband strands is preferably a connector of the universal serial bus type so that it can be connected to a computer station connector of complementary shape.

The electronic component can be a non-volatile memory for example a Flash memory, which can contain personal data for the person wearing said wristband. The memory can be placed on a flexible or rigid support directly connected to the electric connector.

Preferably, the wristband strand receiving the electric connector includes a hollow part from the end connected to the clasp which extends over at least one portion of the length of the strand. The hollow part is delimited by a top wall and a bottom wall separated by two lateral walls. One part of the electric connector with the memory support is housed in a portion of the hollow part. This part of the connector can also include a through aperture in the transverse direction of the wristband for the passage of a pin for fixing it to the wristband.

Several regularly spaced apertures of circular shape are made on either side of the lateral walls of the hollow part of the flexible strand and in the lengthways direction of the wristband. In this way, prior to assembling the part of the connector to be fixed with the wristband clasp, the size of the wristband can be fitted to the user's wrist by cutting a portion of the hollow part. After this operation, a fixing pin passes through a sleeve of the clasp, one aperture of each lateral wall of the wristband strand and the aperture of the part of the connector to be fixed.

The clasp can advantageously include a male part and a female part of complementary shape to the male part so that the male part can be inserted into the female part in the closed position of the wristband. The electric connector of the clasp can be for example the male part.

In the case of a clasp with an unfolding buckle, the base can be extendible. In order to do this, it includes a receptacle and an element able to slide in part into the receptacle. This element is held in part in the inside of the receptacle by a return spring. A first limb of the clasp is hinged to one end of one part of the element leaving the receptacle, and a second limb of the clasp is hinged to an opposite end of the receptacle. The first limb is fixed to one end of the first strand, whereas the second limb is fixed to one end of the second strand. The return spring in the receptacle draws the element towards the interior of the receptacle so as to close the clasp when the connector as the male part is inserted into the female part of the second strand.

As the male part of the clasp, the electric connector can also include at least one aperture on an external wall forming part of clasp fastening means. One end of a member locking the female part of the clasp is introduced into the aperture of the male part when the clasp is in the closed position. The locking member is rotatably mounted about a rotational axis of the female part and can be manually activated against the return force of a spring for opening the clasp.

It is also an object of the invention to provide a wristwatch which includes electrical connection means that overcomes the drawbacks of the aforementioned prior art. The connection means are arranged on the wristband to avoid detracting from the aesthetic appearance of the wristwatch when it is worn on a user's wrist.

The invention also concerns a wristwatch, which includes the features recited in the appended claims.

The wristwatch can advantageously include in the case an electric or electronic component other than a time-keeper circuit. The component is electrically connected by conductive paths through the case and one strand of the wristband to the electric connector which is arranged in a part of the clasp. When the clasp is in the open position, the connector can be connected to a connector of complementary shape of an electric apparatus, such as a computer station for transferring energy and/or one-directional or two-directional data transfer.

BRIEF DESCRIPTION OF THE DRAWINGS

The objects, advantages and features of the wristband or wristwatch will appear more clearly in the following description of embodiments of the invention in conjunction with the drawings, in which.

DESCRIPTION OF PREFERRED EMBODIMENTS

In the following description, the various mechanical means for opening and closing the clasp of a wristband or wristwatch will not be explained in detail, since they form part of the general knowledge of those skilled in this technical field.

It should be noted that the dimensions of all of the elements of the wristband with a clasp or the wristwatch according to the invention have not been shown precisely in the Figures. These elements are shown purely by way of illustration and can thus undergo multiple dimensional changes within the scope of the invention.

Figure 1A:
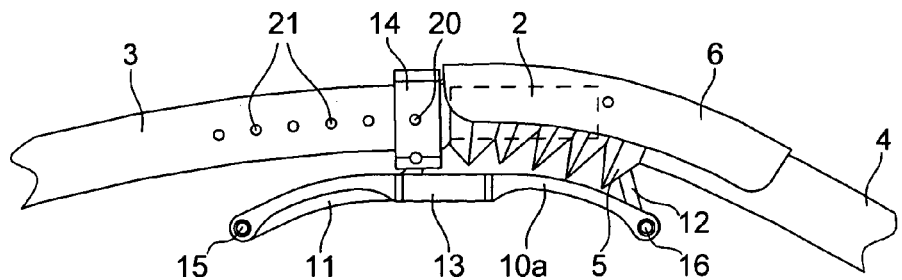
FIGS. 1a and 1b show a side view of one part of the wristband having a clasp in position where the unfolding buckle of the clasp is closed and a three-dimensional view of one part of the wristband with the clasp in an open position according to a first embodiment of the invention.
Figure 1B:
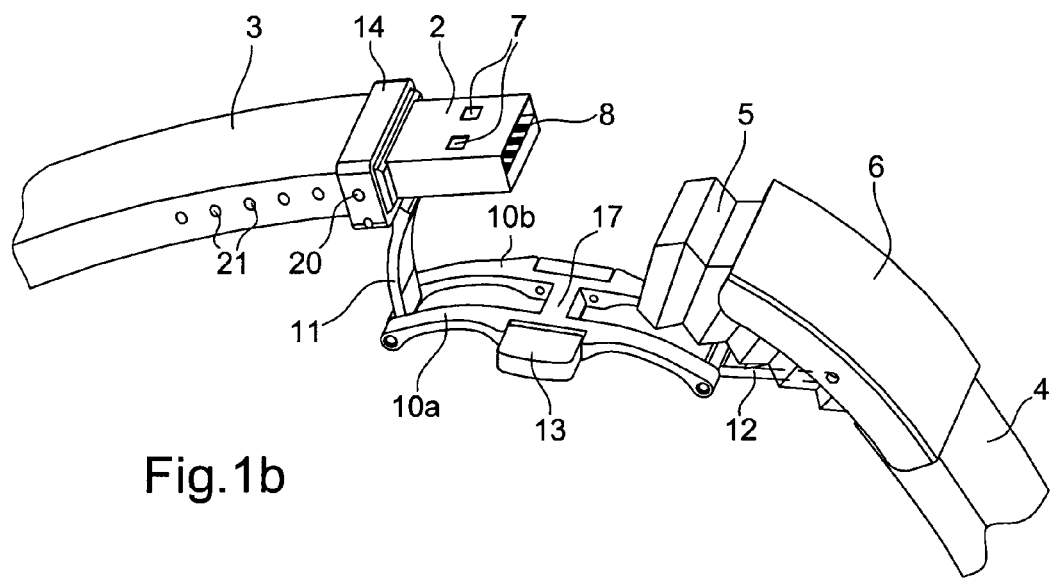

In FIGS. 1a and 1b a first embodiment of the wristband with a clasp 1 having an unfolding buckle is shown in a closed position and in an open position. The wristband can comprise a single strand or two strands 3 and 4 if it is used for a wristwatch. The wristband includes a clasp 1 of the unfolding buckle type one part of which is secured to one end of strand 3 and another part is fixed to one end of strand 4. The other end of each strand, which is not shown, can be conventionally rotatably mounted on the case of a wristwatch. Electrical connection means, such as an electric connector 2, are placed at the end of strand 3 as part of the clasp.

Clasp 1 with an unfolding buckle includes, in particular, an H-shaped rigid base strip and two rigid strips 11 and 12 each hinged to one of the respective ends of the base strip. This base strip is formed of two parallel arms 10a and 10b which are separated from each other by a central bar 17. A first end of each strip 11 and 12 is thus pivotably mounted between the ends of arms 10a and 10b each about a rotational axis 15 and 16.

A second end of strip 11 is rotatably connected to a sleeve 14 for fixing clasp 1 to one end of strand 3, whereas a second end of the other strip 12 is rotatably connected to a fastening piece 6 secured to one end of strand 4. This fastening piece preferably has a U-shaped transverse section.

Strips 11 and 12 also include, in a known manner, fastening means that are not shown in FIGS. 1a and 1b for cooperating with a notch device arranged between arms 10a and 10b when the clasp is in the closed position. A button 13 of the base strip can be pressed manually in order for the pivoting strips to be released from their closed position.

Strand 3 of the wristband includes a hollow part at least at one end on the clasp side so that electrical connection means 2 can be mounted as part of the clasp. The hollow part extends over at least one portion of the length of strand 3.

The hollow part is delimited by a top wall and a bottom wall separated by two lateral walls.

Several regularly spaced apertures 21 are made on either side of the lateral walls of the hollow part of the flexible strand and in the lengthways direction of the wristband. Sleeve 14, which includes an aperture on each lateral wall, can be secured to strand 3 by means of a pin 20 passing through one of the apertures of each lateral wall of the hollow part in proximity to the end of strand 3. As explained with reference to FIG. 2 strand 3 can be cut so as to fit the size of the wristband to the wrist of a user of said wristband.

The connection means are preferably formed by a universal serial bus or USB 2. This connector 2 can thus be connected to a connector of complementary shape of an electric apparatus, such as a computer station, in order to transmit data with a component or electronic circuit of the wristband.

This connector 2 includes certain electric connection metal conductive paths 8 which are arranged on a support plate. This support plate is placed inside a preferably metal tubular part of rectangular transverse section. This tubular part includes apertures 7 arranged above and below. These apertures can form part of the fastening means as explained hereinbefore with reference to FIGS. 4a and 4b.

When connector 2 is connected to a connector of complementary shape, particularly a computer station, the metal paths 8 come into contact with the respective paths of the connector of said computer station. In this way, data and/or energy transmission can be achieved between the computer station and an electronic component connected to the connector.

One part of electric connector 2 includes a through aperture arranged in a transverse direction to the wristband for the passage of securing pin 20. Once the size of strand 3 has been adjusted, the part of connector 2 is introduced into the hollow part of strand 3 to be secured with sleeve 14 by pin 20 to the end of strand 3. Preferably, the part of connector 2 introduced into the hollow part is in contact with the inner surfaces of said hollow part so as to be fixedly secured to the end of strand 3.

In order to protect connector 2 when the clasp is in the closed position, bellows 5 can be fixed to the end of strand 4. These bellows are slightly compressed against sleeve 14 in the closed position enclosing electric connector 2. The closing part 6 surrounds the bellows and facilitates fastening of the clasp to hold one part of strips 11 and 12 against arms 10a and 10b.

Of course, closing part 6 and sleeve 14 can include complementary fastening means that are not shown to replace the fastening means of strips 11 and 12 and the notch device. In such case, button 13 is no longer necessary.

Figure 2:
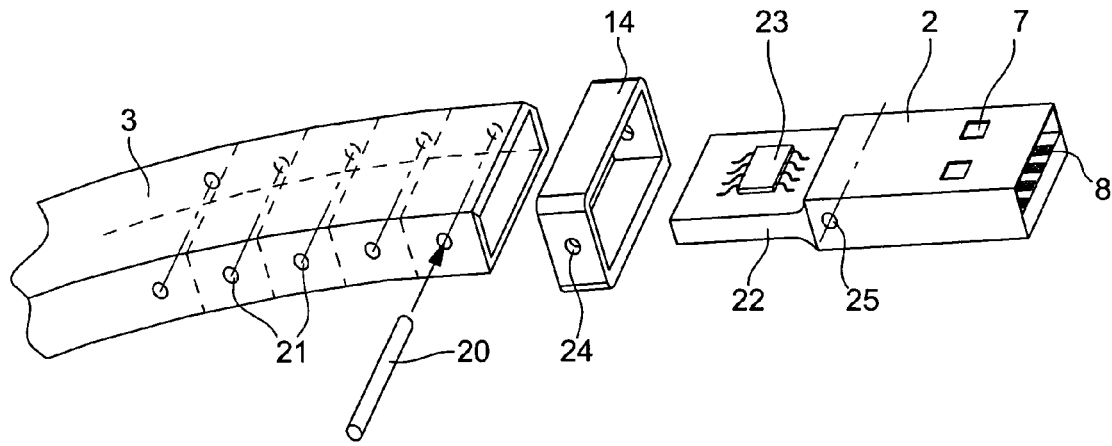
FIG. 2 shows partially the elements of the wristband clasp with the electric connector in an exploded view prior to the assembly thereof at the end of the wristband strand of FIGS. 1a and 1b, FIGS. 3a to 3c show two side views of one part of the wristband with a clasp in a position where the unfolding buckle of the clasp is open and a side view of one part of the wristband with the clasp in the closed position according to a second embodiment of the invention.
Figure 2A:
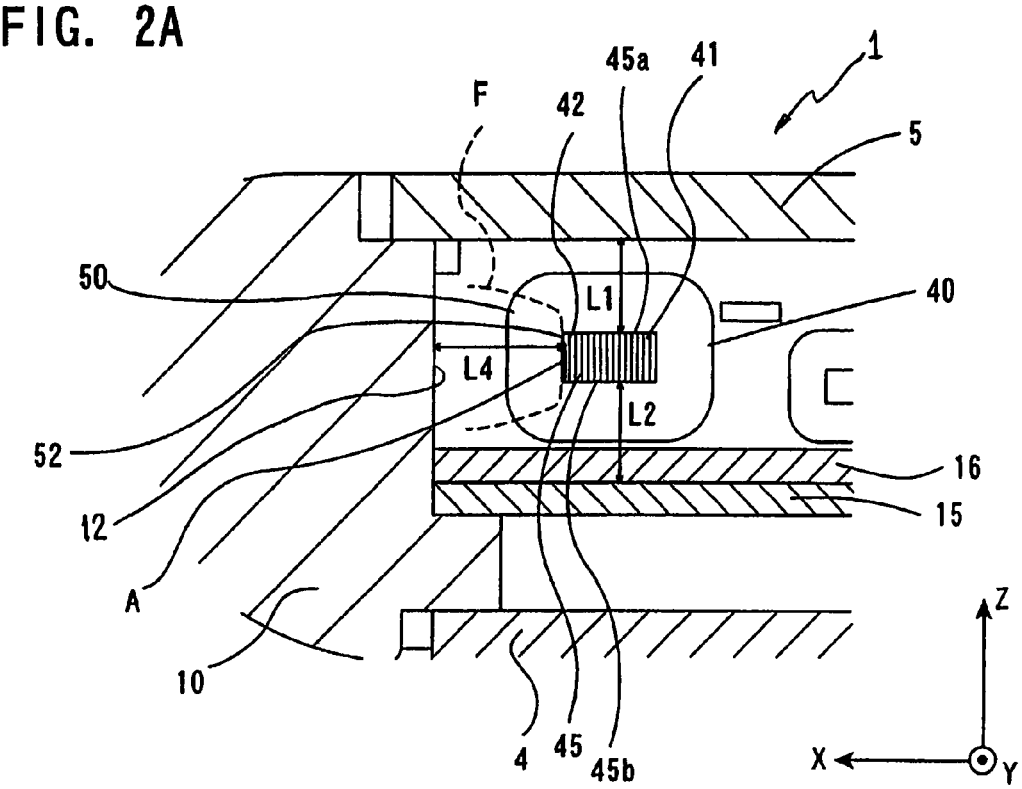
Figure 2B:
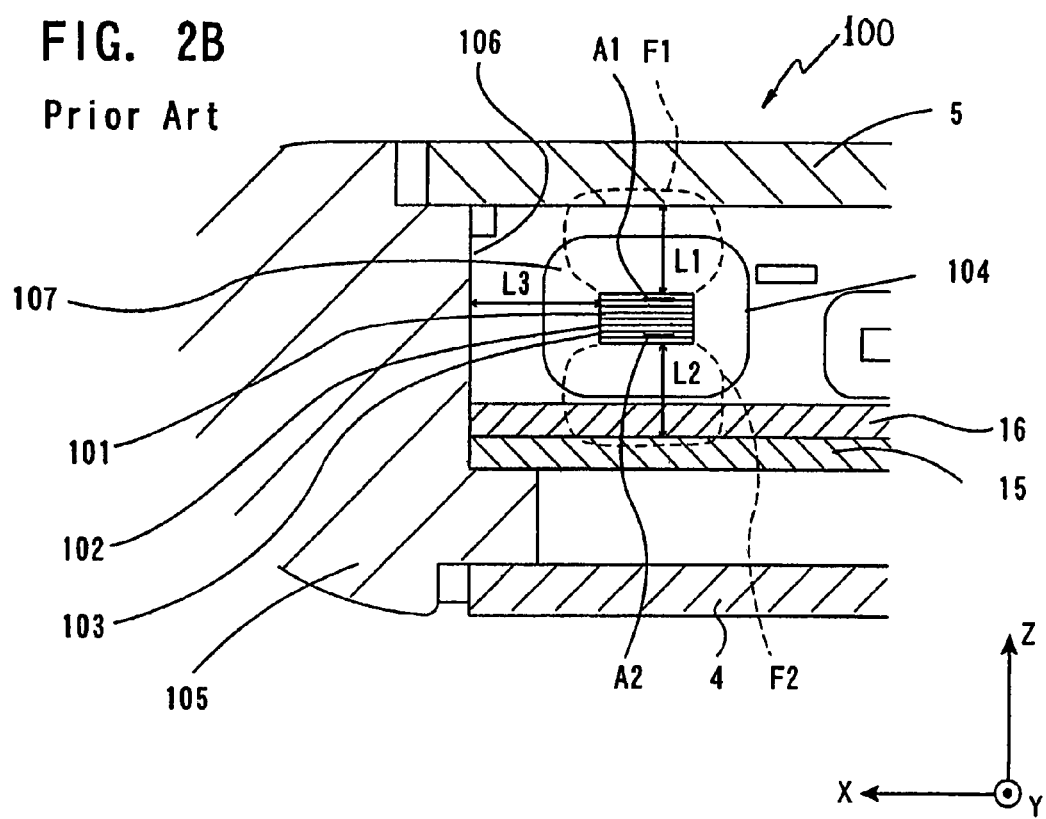

In FIG. 2 the elements of the clasp on the side of strand 3 are partially shown in an exploded view prior to being finally mounted.

It will be noted that an electronic component, such as a non-volatile memory 23, is fixed to a conductive path support 22. The memory can preferably be a Flash memory in which personal data can be stored relating for example to the wristband user. This support is directly connected to one end of electric connector 2, which is opposite the end used for connection to an electric apparatus. An electric connection is made in a known manner between the metal connection lugs of the encapsulated memory and the conductive paths 8 of connector 2.

Several regularly spaced circular apertures 21 are made on each lateral wall of strand 3 for securing the sleeve and the connector at different positions on strand 3 using pin 20.

Before securing sleeve 14 and connector 2 to the end of strand 3, it is possible to cut strand 3 so as to adjust the size of the wristband to the user's wrist. Dotted lines are shown on strand 3 in FIG. 2 to show the places where the strand can for example be cut to adjust the size of the wristband.

After having cut strand 3 to the desired size, sleeve 14 is placed externally at the end of the hollow part of strand 3 so that apertures 24 of the sleeve are opposite an aperture of each lateral wall of the hollow part. The shape of the inner part of the sleeve is adapted to come into direct contact with the external surfaces of the hollow part.

Support 22 is subsequently introduced into the hollow part until through aperture 25 of the connector part to be fixed is opposite the apertures of sleeve 14. Finally, in order to fix this part of the clasp, pin 20 can be inserted from one of apertures 24 of sleeve 14 as far as the other aperture 24 passing through the respective apertures 21 of the hollow part and aperture 25 of the connector.

Figure 3A:
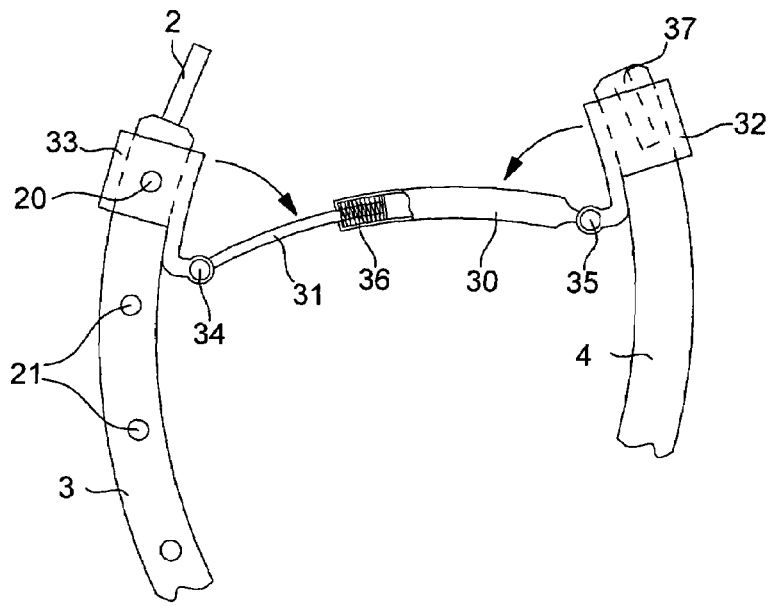
Figure 3B:
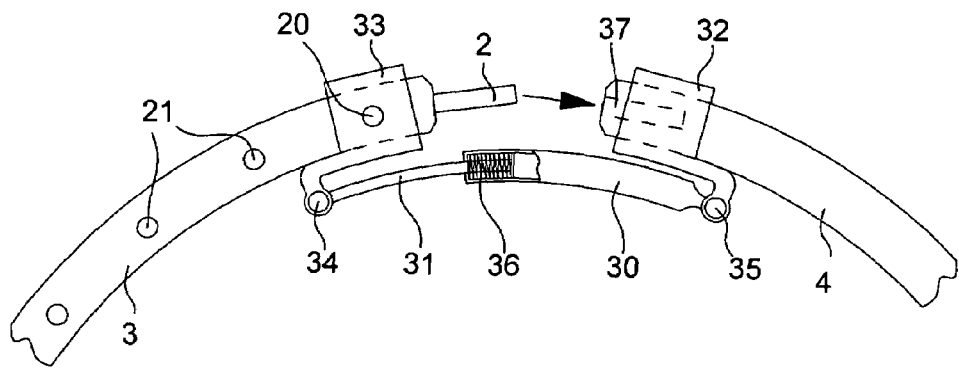
Figure 3C:
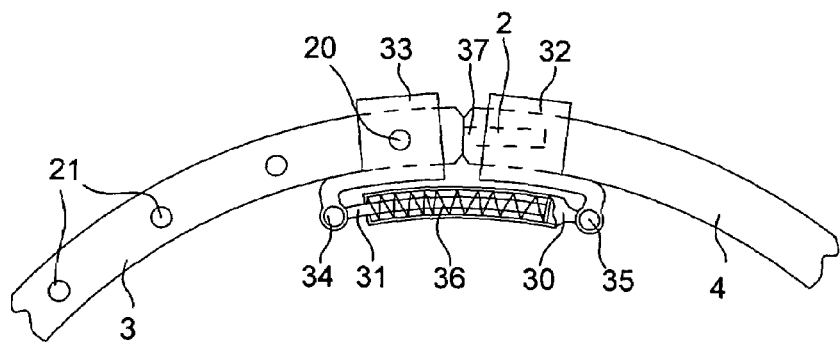

A second embodiment of the wristband with a clasp is shown in FIGS. 3a to 3c. The clasp connecting one end of each wristband strand is of the unfolding buckle type.

It should be noted that only those elements of the wristband with a clasp that differ from those described hereinbefore are explained. The elements of this second embodiment, which are identical to those of the first embodiment, bear identical reference numerals.

In this second embodiment, the base of the clasp is extendible. In order to do this, the base includes a curved receptacle 30 and a curved element 31 that can slide in part into the receptacle.

A first limb 33 of the clasp is hinged about a rotational axis 34 at one end of a part of the element leaving the receptacle, and a second limb 32 of the clasp is hinged about a rotational axis 35 at an opposite end of receptacle 30. The first limb 33 is fixed to one end of strand 3, whereas the second limb 32 is fixed to one end of the second strand. The first limb is fixed to strand 3 by a pin 20 passing through an aperture of each lateral wall of strand 3 in proximity to the end thereof where electric connector 2 is mounted.

Return spring 36 in the receptacle pulls element 31 towards the inside of the receptacle so as to close the clasp when connector 2 as the male part is inserted into a compartment 37 forming the female part at the end of strand 4. Given that receptacle 30 and sliding element 31 are curved, the compartment has to be of sufficient size to avoid damaging the electric connector when it is introduced into or removed from said compartment.

In FIG. 3a, the clasp is completely open with element 31 compressing the return spring in receptacle 30. This return spring can be a compression spring. Of course, this position of the clasp is obtained manually by pulling on each element 33 and 34 to compress said spring 36. In order to be able to close said clasp, limbs 33 and 32 have to be folded down onto the side of the receptacle and the sliding element as shown by the arrows.

In FIG. 3b, limbs 32 and 33 are shown folded down on the side of receptacle 30 and sliding element 31. In this open position, electric connector 2 is directed towards compartment 37 which has to receive it. The arrow indicates the movement of connector 2 in direction of compartment 37 in order to close the clasp.

Finally in FIG. 3c, the wristband clasp is mounted in a closed position with the electric connector which acts as the male part housed in compartment 37 acting as the female part. Return spring 36 maintains this closed position without any manual action on one or other limb 32 or 33.

Figure 4A:
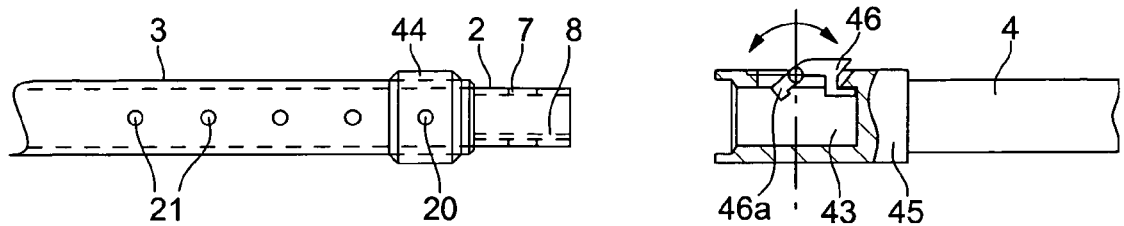
FIGS. 4a and 4b show a side view and a top view of one part of the wristband with a clasp with the clasp in the closed position according to a third embodiment of the invention.
Figure 4B:
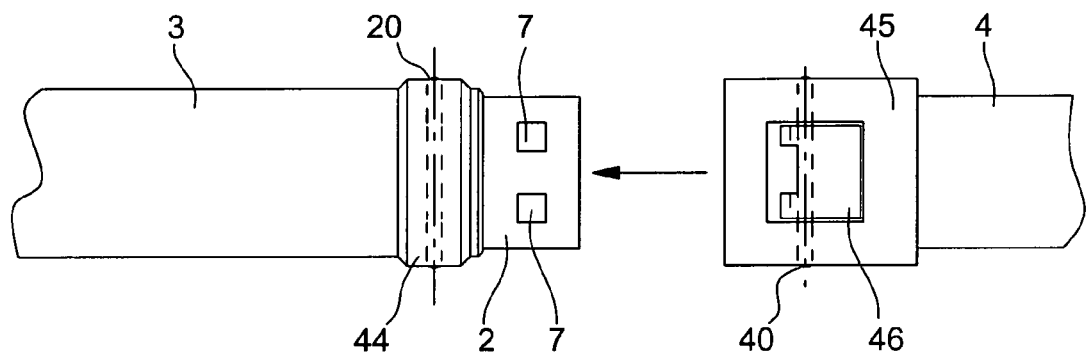

A third embodiment of the wristband with a clasp is shown in FIGS. 4a and 4b with the clasp in the open position. The wristband of this third embodiment is of the open type, i.e. in the open position, the part of the clasp fixed to the end of strand 3 is separated from the part of the clasp fixed to the end of strand 4.

As previously, only those elements of the wristband with a clasp which differ from those described hereinbefore are explained in detail. The elements of this third embodiment, which are identical to those of the first and second embodiments, bear the same reference numerals.

A rigid sleeve 44 is mounted at the end of the hollow part of strand 3, as well as the electric connector 2 of the universal serial bus type in order to form a male part of the clasp. This sleeve 44 is placed on the external surfaces of the hollow part, whereas a part of connector 2 with support bearing the electronic component is introduced into the hollow part.

As explained with reference to FIG. 2, a securing pin 20 passes through apertures of sleeve 44, one aperture of each lateral wall at the end of strand 3 and one through aperture made in the electric connector. Preferably, the part of connector 2 introduced into the hollow part is in contact with the inner surfaces of said hollow part so as to be fixedly held at the end of strand 3.

In this third embodiment, apertures 7 of electric connector 2 acting as the male part form part of the clasp fastening means.

The other female part of the clasp is fixed to the end of strand 4. This female part of the clasp includes a securing unit 45 in which a cavity 43 is made of complementary shape to the connector to receive the latter in the closed position of the clasp. A locking member 46 is rotatably mounted in unit 45 about a rotational axis 40 arranged transversely to the wristband. Two hooks 46a at the front end of the locking member form part of the clasp fastening means, able to be introduced into the connector apertures in the closed position of the clasp. The back part of this member arranged outside securing unit 45 can be manually activated against the return force of a spring that is not shown for opening the clasp. A back stop element of the locking member comes into contact with an inner stop element of securing unit 45 to hold the locking member in a closed position owing to the force of the spring.

Figure 5:
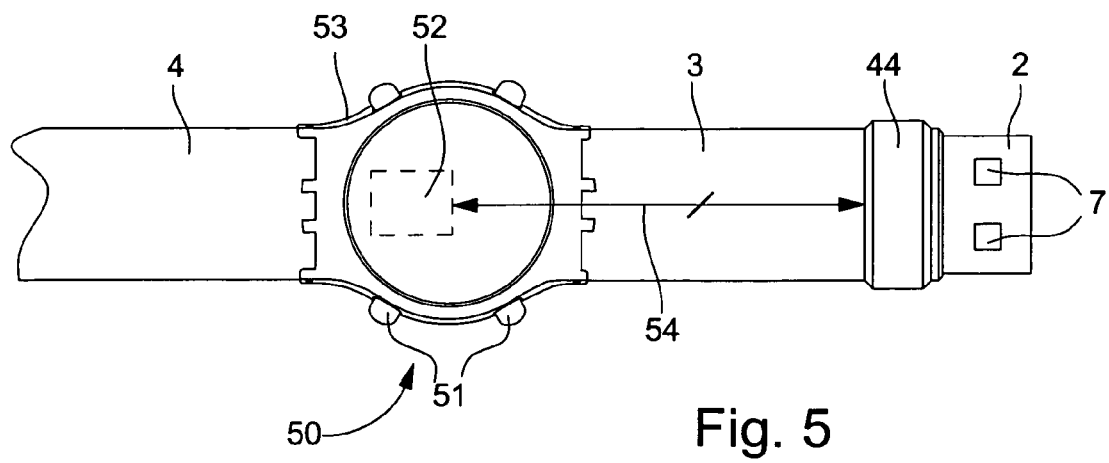
FIG. 5 shows a bottom view of a wristwatch according to the invention, which includes a wristband with a clasp in accordance with FIGS. 4a and 4b.

FIG. 5 shows a wristwatch 50 provided with a wristband of the type described with reference to FIGS. 4a and 4b. The wristwatch includes selection buttons 51 arranged around case 53, a watch movement or time-keeper circuit inside its case 53, and an electric or electronic component 52. A connection path bus 54 connects the metal paths of electric connector 2 in a known manner to the electric or electronic component placed inside the case. When the clasp is in the open position, the electric connector 2 can be connected to a connector of complementary shape of an electric apparatus, such as a computer station or a charger for carrying out data and/or electric energy transmission.

From the description that has just been given, multiple variants of the wristband with a clasp or wristwatch can be devised by those skilled in the art without departing from the scope of the invention defined by the claims. The wristband may comprise only the electrical connection means with conductive paths integrated in one of the wristband strands to establish an electric connection with a component housed in a case of a portable object. The wristband may be formed by a single strand at the ends of which the clasp is placed with the electric connector. This electric connector can be of a different type to a universal serial bus and can be fixed without a sleeve directly to the end of one of the strands, which has no hollow part or apertures on the lateral walls.

The invention claimed is:

1. A wristband with a clasp including electrical connection means for electrical connection to at least one electric or electronic component, the electrical connection means including an electric connector arranged in one part of the clasp, said connector being configured so as to be able to be connected, when the clasp is in the open position, to a connector of complementary shape of an electric apparatus to carry out data and/or electric energy transmission with at least one electric or electronic component,
   wherein the electric connector fixed to one end of a strand of the wristband forms a male part of the clasp, which is covered when the clasp is in the closed position by a fastening piece of another end of the same strand or an end of another wristband strand, and
   wherein bellows of the clasp are fixed to the other end of the wristband strand or the end of the other wristband strand underneath the fastening piece to enclose and protect the electric connector when the clasp is in the closed position with the bellows slightly compressed against a sleeve fixed to the end of the wristband strand with the electric connector.

2. The wristband according to claim 1, wherein the electric connector defines an electric connector of the universal serial bus type so as to be able to be connected to a connector of complementary shape of a computer station for data transfer.

3. The wristband according to claim 1, wherein it includes the electric or electronic component electrically connected to the electric connector.

4. The wristband according to claim 1, wherein the clasp includes a male part formed by the connector, which can be inserted into a female part when the clasp is in the closed position.

5. The wristband according to claim 4, wherein the female part of another end of the same wristband strand or one end of another strand of the wristband includes a cavity of complementary shape to the electric connector.

6. The wristband according to claim 1, wherein the clasp of the unfolding buckle type includes a base, and two strips or two limbs each hinged to an opposite end of the base, the first strip or the first limb being connected to the end of a first wristband strand, whereas the second strip or the second limb is connected to the end of a second wristband strand, and wherein the electric connector is fixed to the end of the first wristband strand.

7. The wristband according to claim 6, wherein the extending type base includes a receptacle and an element able to slide in part into the receptacle, the element being held in part inside the receptacle by a return spring in the direction of a closed position of the clasp, wherein the connector is fixed to one end of the first strand with one part of the first limb, and wherein the second limb is fixed to one end of the second strand, which includes the cavity of complementary shape to the connector to receive the latter in the closed position.

8. The wristband according to claim 6, wherein the base includes two parallel arms separated by a central bar, one end of the first strip being hinged between the arms at one end of the arms, whereas one end of the second strip is hinged between the arms to a second opposite end of the arms, wherein the other end of the first strip is rotatably connected to a sleeve fixed on exterior surfaces of the first strand, whereas the other end of the second strip is rotatably connected to a fastening piece fixed to one end of the second strand, this fastening piece covering the electric connector when the clasp is in the closed position, wherein the fastening means are provided in the base and on the strips to lock one part of each strip into the base in the closed position, and wherein an unlocking button mounted on the base can be activated manually to release the strips from their closed position.

9. The wristband according to claim 1, wherein the electronic component is a non-volatile memory in which personal data can be stored, the memory being placed on a support fixed directly to the electric connector and electrically connected to conductive paths of the connector.

10. The wristband according to claim 1, wherein the first wristband strand receiving the electric connector includes a hollow part from the free end of the clasp which extends over at least one portion of the length of strand, this hollow part being delimited by a top wall and a bottom wall separated by two lateral walls, and wherein one part of the electric connector with the memory support is housed and fixed into one portion of the hollow part.

11. The wristband according to claim 10, wherein several apertures of circular shape are regularly spaced on either side of the lateral walls of the hollow part of the flexible strand and in the lengthways direction of the wristband so that the size of the strand can be adjusted to a user's wrist.

12. The wristband according to claim 10, wherein the part of the connector to be fixed can also include, in a transverse direction to the wristband, a through aperture for the passage of a pin to be secured to the wristband, and wherein a sleeve placed on the external surfaces of the hollow part is fixed using the pin with the electric connector, said securing pin passing through one aperture of each lateral wall of the wristband strand in proximity to the end of said strand.

13. The wristband according to claim 4, wherein the connector of the universal serial bus type includes at least one aperture on an external wall for cooperating with at least one hook of a locking member of a securing unit of the female part of the clasp in order to hold the clasp in the closed position when the connector is housed in a cavity of complementary shape of the securing unit, one part of the locking member outside the securing unit being able to be activated manually in order to open the clasp.

14. A watch including a wristband with a clasp according to claim 1, the wristwatch having at least one electric or electronic component electrically connected to electric connection means of the wristband, the electric connection means including an electric connector arranged in one part of the clasp, said connector being configured so as to be able to be connected, when the clasp is in the open position, to a connector of complementary shape of an electric apparatus to carry out electric energy and/or data transmission, wherein the electric connector fixed to one end of one wristband strand forms the male part of the clasp, which is covered when the clasp is in the closed position by a fastening piece of another end of the same strand or one end of another strand of the wristband, and wherein bellows of the clasp are fixed to one end of the second wristband strand underneath the fastening piece to enclose and protect the electric connector when the clasp is in the closed position with the bellows slightly compressed against a sleeve fixed to the end of the wristband strand with the electric connector.

15. The watch according to claim 14, wherein the electronic component is a non-volatile memory placed inside the case of the watch, the component being electrically connected to the electric connector placed in one part of the clasp by a connection path bus, and wherein the electric connector defines a universal serial bus type connector so as to be able to be connected to a connector of complementary shape of a computer station for data transfer.

16. A wristband with a clasp including electrical connection means for electrical connection to at least one electric or electronic component, the electrical connection means including an electric connector arranged in one part of the clasp, said connector being configured so as to be able to be connected, when the clasp is in an open position, to a connector of complementary shape of an electric apparatus to carry out data and/or electric energy transmission with at least one electric or electronic component, wherein the electric connector fixed to one end of a strand of the wristband forms a male part of the clasp, which is covered when the clasp is in the closed position by a fastening piece of another end of the same strand or an end of another wristband strand, wherein the wristband strand receiving the electric connector includes a hollow part from the free end of the clasp which extends over at least one portion of the length of said strand, this hollow part being delimited by a top wall and a bottom wall separated by two lateral walls, wherein one part of the electric connector with the memory support is housed and fixed into one portion of the hollow part, and wherein several apertures of circular shape are regularly spaced on either side of the lateral walls of the hollow part of the flexible strand and in the lengthways direction of the wristband so that the size of the strand can be adjusted to a user's wrist and allow fixing of the electric connector.

* * * * *